United States Patent
Hassan et al.

(10) Patent No.: US 7,424,365 B2
(45) Date of Patent: Sep. 9, 2008

(54) APPARENT DIP ANGLE CALCULATION AND IMAGE COMPRESSION BASED ON REGION OF INTEREST

(75) Inventors: Gamal A. Hassan, Houston, TX (US); Philip L. Kurkoski, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 104 days.

(21) Appl. No.: 11/485,816

(22) Filed: Jul. 13, 2006

(65) Prior Publication Data

US 2007/0027629 A1 Feb. 1, 2007

Related U.S. Application Data

(60) Provisional application No. 60/699,792, filed on Jul. 15, 2005.

(51) Int. Cl.
*G01V 3/18* (2006.01)
(52) U.S. Cl. .......................................................... 702/7
(58) Field of Classification Search .................. 702/6, 702/7, 9, 10, 11, 12
See application file for complete search history.

(56) References Cited

U.S. PATENT DOCUMENTS

| | | | |
|---|---|---|---|
| 5,091,644 A | | 2/1992 | Minette ....................... 250/254 |
| 5,519,668 A * | | 5/1996 | Montaron ....................... 367/35 |
| 5,550,788 A * | | 8/1996 | Pavone et al. .................. 367/25 |
| 5,663,929 A * | | 9/1997 | Pavone et al. .................. 367/82 |
| 5,684,693 A * | | 11/1997 | Li .................................. 702/6 |
| 5,790,185 A * | | 8/1998 | Auzerais et al. ................. 348/84 |
| 5,995,447 A * | | 11/1999 | Mandal et al. .................. 367/35 |
| 6,002,639 A * | | 12/1999 | Birchak et al. .................. 367/35 |
| 6,021,093 A * | | 2/2000 | Birchak et al. .................. 367/25 |
| 6,021,198 A * | | 2/2000 | Anigbogu et al. ............. 380/269 |
| 6,125,079 A * | | 9/2000 | Birchak et al. .................. 367/35 |
| 6,272,434 B1* | | 8/2001 | Wisler et al. ...................... 702/9 |
| 6,347,283 B1* | | 2/2002 | Soliman et al. .................. 702/6 |
| 6,366,531 B1* | | 4/2002 | Varsamis et al. ............... 367/26 |
| 6,405,136 B1* | | 6/2002 | Li et al. .......................... 702/10 |
| 2004/0262008 A1* | | 12/2004 | Deans et al. .................. 166/339 |
| 2006/0015256 A1 | | 1/2006 | Hassan et al. .................... 702/6 |

FOREIGN PATENT DOCUMENTS

| | | |
|---|---|---|
| GB | 2334982 A | 9/1999 |
| WO | WO2004011775 A2 | 2/2004 |
| WO | WO2004067912 A1 | 8/2004 |

OTHER PUBLICATIONS

D. Salomon et al.; *Data Compression: The Complete Reference*, Second Edition, 1998, pp. 540-549.
G. Bernasconi et al.; *Compression of Downhole Data*, SPE/IADC 52806, XP-002405520, 1999 SPE/IADC Drilling Conference, Amsterdam, Holland, Mar. 9-11, 1999, pp. 1-9, 11 Figs.

* cited by examiner

*Primary Examiner*—Donald E McElheny, Jr.
(74) *Attorney, Agent, or Firm*—Madan, Mossman & Sriram, P.C.

(57) ABSTRACT

A data compression technique for MWD applications uses feature detection, extraction, followed by image compression for only the region(s) of interest. The detection approach processes data in real time. It triggers on the start and end of a feature without processing any further features. This provides feature detection with zero latency. Compressing only the region of interest provides data compression with both higher resolution and higher compression ratio.

26 Claims, 9 Drawing Sheets

Compressed Data with 103 : 1 Ratio

APPARENT DIP ANGLE CALCULATION AND IMAGE COMPRESSION BASED ON REGION OF INTEREST

CROSS-REFERENCES TO RELATED APPLICATIONS

This application claims priority from U.S. Provisional Patent Application Ser. No. 60/699,792 filed on 15 Jul. 2005.

FIELD OF THE INVENTION

This invention relates generally to assemblies for making toolface oriented measurements within a borehole and processing of such measurements to determine parameters of interest of materials around the borehole. The invention specifically relates to measurement-while-drilling applications for obtaining formation and methods of real time imaging and compression of the image data.

BACKGROUND OF THE INVENTION

To obtain hydrocarbons such as oil and gas, wellbores (also called the boreholes) are drilled by rotating a drill bit attached at the end of a drilling assembly generally called the "bottom hole assembly" or the "drilling assembly." A large portion of the current drilling activity involves drilling highly deviated or substantially horizontal wellbores to increase the hydrocarbon production and/or to withdraw additional hydrocarbons from the earth's formations. The wellbore path of such wells is carefully planned before drilling such wellbores using seismic maps of the earth's subsurface and well data from previously drilled wellbores in the associated oil fields. Due to the very high cost of drilling such wellbores and the need precisely to place such wellbores in the reservoirs, it is essential continually to determine the position and direction of the drilling assembly and thus the drill bit during drilling of the wellbores. Such information is used, among other things, to monitor and adjust the drilling direction of the wellbores.

In drilling assemblies used until recently, the directional package commonly includes a set of accelerometers and a set of magnetometers, which respectively measure the earth's gravity and magnetic field. The drilling assembly is held stationary during the taking of the measurements from the accelerometers and the magnetometers. The toolface and the inclination angle are determined from the accelerometer measurements. The azimuth is then determined from the magnetometer measurements in conjunction with the tool face and inclination angle.

U.S. Pat. No. 5,091,644 to Minette having the same assignee as the present application teaches a method for analyzing data from a measurement-while-drilling (MWD) gamma ray density logging tool which compensates for rotations of the logging tool (along with the rest of the drillstring) during measurement periods. In accordance with the method disclosed therein, the received signal is broken down into a plurality of sections. In a preferred embodiment, the Minette invention calls for the breaking of the signal from the formation into four different sections: top, bottom, right, left. As the tool rotates, it passes through these four quadrants. Each time it passes a boundary, a counter is incremented, pointing to the next quadrant. This allows for dividing the data into four spectra for each detector. Each of these four spectra will be obtained for ¼th of the total acquisition time. The end result is an image of the wall of the borehole. In many situations, the data are recorded and stored downhole in a suitable memory and processed at the surface after the bottomhole assembly is tripped out of the borehole. In wireline applications, the data are telemetered to the surface and processed there with a surface processor or a remote processor.

There are many applications such as: real time geo-steering, borehole profiling, borehole stability, break out detection, dip and azimuth, fracture detection, etc., that require real time data and imaging. Bandwidth limitations in MWD are one of the most challenging problems for real time applications. Currently the bandwidth ranges from 4 to 20 bits/sec, with a bit error rate dependant on depth, mud weight, downhole pressure, pipe diameter, etc. The demand for real time data is growing much faster than the demand for bandwidth. Data compression and image compression provide a solution to maximize utilization of BW.

In order to improve reliability of the compression technique and thereby minimize transmission time, data type, drilling processes, and bit error rates have to be considered when designing compression algorithms. Formation data in LWD is continuously collected during the drilling process. The borehole shape can be described as a circle or as an ellipse. Image data is usually presented as a rectangular matrix (depth vs. azimuth). The horizontal axis represents azimuthal information while the vertical axis represents depth. Every depth increment represents a period of time where the tool has rotated one or more times. High accuracy data are only required for certain depth intervals in the well. Predetermined knowledge about the well is available from models, seismic data, or offset wells, which helps to determine those regions of interest.

MWD provides continuous data while drilling. The data needs to be divided into segments in such a way that segmentation does not occur at the middle of a feature (i.e.: bed boundary). Equally spaced depth segmentation may destroy the feature if segmentation occurs in the middle of a feature.

MWD provides continuous data while drilling. The data needs to be divided into segments in such a way that segmentation does not occur at the middle of a feature (i.e.: bed boundary). Equally spaced depth segmentation may destroy the feature if segmentation occurs in the middle of a feature.

MWD sensors are 20 to 100 feet behind the bit. Latency is defined as the time from when the sensors see the formation to the time when that information is available at surface. For the same signal to noise ratio, reducing the size of a data block reduces the compression ratio while increasing the latency.

Getting data from tool memory can take up too several days, (i.e.: pulling the tool to surface). If the tool is lost down hole, the data is lost.

There is a need for a method of real time imaging of data acquired downhole and extracting features descriptive of the data so that the extracted features can be transmitted uphole substantially in real time within the limitations of the telemetry system that is available. The present invention satisfies this need.

SUMMARY OF THE INVENTION

One embodiment of the invention is a method of evaluating an earth formation. A bottomhole assembly is conveyed into a borehole in the earth formation. Measurements indicative of a property of the earth formation are made with a formation evaluation sensor on the BHA during rotation of the BHA. The presence of a feature is identified in the measurements and data indicative of a region of interest including the feature is transmitted to a surface location. Identification of a feature may be done by using a cost function based on a direction of change of the measurements and a change in a value of the measurements. The feature may be a bed boundary in the earth formation. The transmitted data may include a dip and a location of a bed boundary. The transmission may be done with substantially zero latency. An additional feature may be identified with a drill stand prior to transmission of the data. A data-compression operation using a discrete cosine transform or a wavelet transform may be used. The data may be quantized using a set partitioning in a hierarchical tree. The measurements may be density measurements, porosity measurements and/or resistivity measurements. A image of the formation may be reconstructed.

Another embodiment of the invention is an apparatus for evaluating an earth formation. The apparatus includes a bottomhole assembly (BHA) conveyed into a borehole in the earth formation. At least one formation evaluation sensor on the BHA makes a measurement indicative of a property of the formation during rotation of the BHA. A processor identifies a feature in the measurements and transmits data to a surface location indicative of a region of interest including the feature. The processor may identify the feature by using a cost function based on a direction of change of the measurements and a change in the value of the measurements. The feature identified by the processor may be related to a bed boundary. The processor may further check for a latency key. The processor may further identify the presence of an additional feature in the measurements within a drill stand. The processor may perform a data compression using a discrete cosine transform and/or a wavelet transform. The processor may perform a set partitioning in hierarchical trees (SPIHT). The FE sensor may be a density sensor, a porosity sensor and/or a resistivity sensor. A drilling tubular may convey the BHA into the borehole. The apparatus may further include an orientation sensor which makes measurements during rotation of the BHA and the processor may use the orientation sensor measurements in binning measurements made by the FE sensor.

Another embodiment of the invention is a computer-readable medium for use with an apparatus for evaluating an earth formation. The apparatus includes a bottomhole assembly (BHA) conveyed into a borehole in the earth formation. At least one formation evaluation (FE) sensor makes measurements indicative of a property of the earth formation during rotation of the BHA. The medium comprises instructions that enable a processor to identify the presence of a feature in the measurements and transmit data to a surface location indicative of a region of interest including the feature. The medium may include a ROM, an EPROM, an EEPROM, a flash memory, and/or an optical disk.

Another embodiment of the invention is a method of evaluating an earth formation. A bottomhole assembly (BHA) is conveyed into a borehole in the earth formation. A formation evaluation sensor on the BHA makes measurements indicative of a property of the earth formation during rotation of the BHA. An image substantially covering 360° is defined from the measurements. The full image is compressed using a 2-D transform of the entire image and a quantization. A compressed image is then transmitted to the surface. The measurements may include density measurements, porosity measurements and/or resistivity measurements. An image of the formation may be reconstructed from the compressed image. The quantization may involve a set partitioning in hierarchical trees.

Another embodiment of the invention is an apparatus for evaluating an earth formation. The apparatus includes a bottomhole assembly (BHA) conveyed in a borehole in the earth formation. At least one formation evaluation (FE) sensor makes measurements indicative of a property of the earth formation during rotation of the BHA. A processor accumulates measurements to define an image over substantially 360° over a range of depths, compresses the entire image using a single 2-D transform and a quantization, and transmits a compressed image to a surface location. The FE sensor may be a density sensor, a porosity sensor or a resistivity sensor. The apparatus may further include a surface processor which reconstructs an image of the formation.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DETAILED DESCRIPTION OF THE PREFERRED EMBODIMENTS

Figure 1:
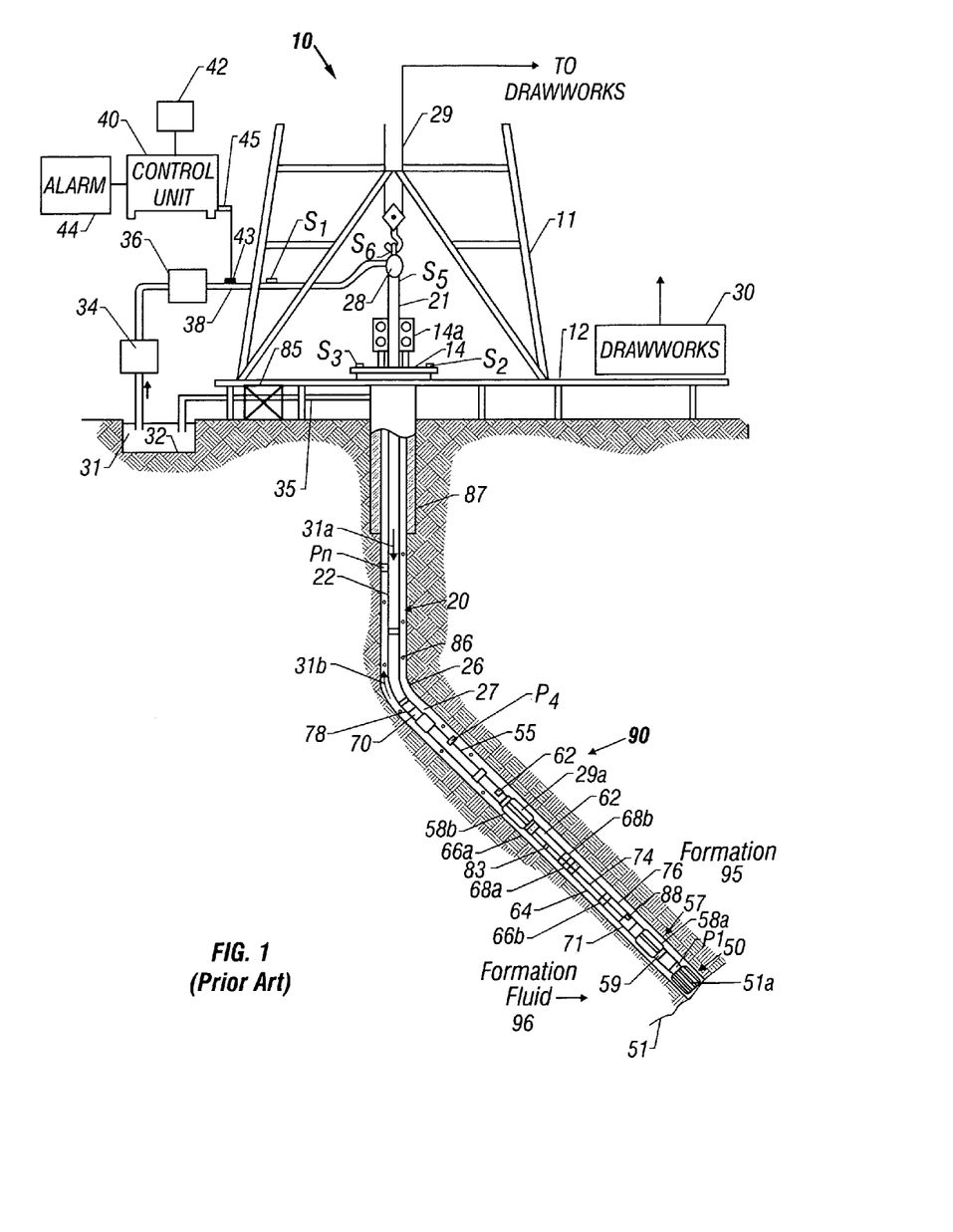
FIG. 1 (prior art) shows a schematic diagram of a drilling system that includes the apparatus of the current invention in a measurement-while-drilling embodiment.

The present invention is described with reference to a drilling assembly, although many of the methods of the present invention are also applicable with logging tools conveyed on a wireline and may also be used in cased boreholes. FIG. 1 shows a schematic diagram of an exemplary drilling system 10 such as that disclosed by Estes. The drilling system has a bottom hole assembly (BHA) or drilling assembly 90 that includes gyroscope. For some of the applications of the present invention, a gyroscope is not essential. The BHA 90 is conveyed in a borehole 26. The drilling system 10 includes a conventional derrick 11 erected on a floor 12 which supports a rotary table 14 that is rotated by a prime mover such as an electric motor (not shown) at a desired rotational speed. The drill string 20 includes a tubing (drill pipe or coiled-tubing) 22 extending downward from the surface into the borehole 26. A drill bit 50, attached to the drill string 20 end, disintegrates the geological formations when it is rotated to drill the borehole 26. The drill string 20 is coupled to a drawworks 30 via a kelly joint 21, swivel 28 and line 29 through a pulley (not shown). Drawworks 30 is operated to control the weight on bit ("WOB"), which is an important parameter that affects the rate of penetration ("ROP"). A tubing injector 14a and a reel (not shown) are used as instead of the rotary table 14 to inject the BHA into the wellbore when a coiled-tubing is used as the conveying member 22. The operations of the drawworks 30 and the tubing injector 14a are known in the art and are thus not described in detail herein.

During drilling, a suitable drilling fluid 31 from a mud pit (source) 32 is circulated under pressure through the drill string 20 by a mud pump 34. The drilling fluid passes from the mud pump 34 into the drill string 20 via a desurger 36 and the fluid line 38. The drilling fluid 31 discharges at the borehole bottom 51 through openings in the drill bit 50. The drilling fluid 31 circulates uphole though the annular space 27 between the drill string 20 and the borehole 26 and returns to the mud pit 32 via a return line 35 and drill cutting screen 85 that removes the drill cuttings 86 from the returning drilling fluid 31b. A sensor $S_1$ in line 38 provides information about the fluid flow rate. A surface torque sensor $S_2$ and a sensor $S_3$ associated with the drill string 20 respectively provide information about the torque and the rotational speed of the drill string 20. Tubing injection speed is determined from the sensor $S_5$, while the sensor $S_6$ provides the hook load of the drill string 20.

In some applications the drill bit 50 is rotated by only rotating the drill pipe 22. However, in many other applications, a downhole motor 55 (mud motor) is disposed in the drilling assembly 90 to rotate the drill bit 50 and the drill pipe 22 is rotated usually to supplement the rotational power, if required, and to effect changes in the drilling direction. In either case, the ROP for a given BHA largely depends on the WOB or the thrust force on the drill bit 50 and its rotational speed.

The mud motor 55 is coupled to the drill bit 50 via a drive disposed in a bearing assembly 57. The mud motor 55 rotates the drill bit 50 when the drilling fluid 31 passes through the mud motor 55 under pressure. The bearing assembly 57 supports the radial and axial forces of the drill bit 50, the downthrust of the mud motor 55 and the reactive upward loading from the applied weight on bit. A lower stabilizer 58a coupled to the bearing assembly 57 acts as a centralizer for the lowermost portion of the drill string 20.

A surface control unit or processor 40 receives signals from the downhole sensors and devices via a sensor 43 placed in the fluid line 38 and signals from sensors $S_1$-$S_6$ and other sensors used in the system 10 and processes such signals according to programmed instructions provided to the surface control unit 40. The surface control unit 40 displays desired drilling parameters and other information on a display/monitor 42 that is utilized by an operator to control the drilling operations. The surface control unit 40 contains a computer, memory for storing data, recorder for recording data and other peripherals. The surface control unit 40 also includes a simulation model and processes data according to programmed instructions. The control unit 40 is preferably adapted to activate alarms 44 when certain unsafe or undesirable operating conditions occur.

The BHA may also contain formation evaluation sensors or devices for determining resistivity, density and porosity of the formations surrounding the BHA. A gamma ray device for measuring the gamma ray intensity and other nuclear and non-nuclear devices used as measurement-while-drilling devices are suitably included in the BHA 90. As an example, FIG. 1 shows a resistivity measuring device 64. It provides signals from which resistivity of the formation near or in front of the drill bit 50 is determined. The resistivity device 64 has transmitting antennae 66a and 66b spaced from the receiving antennae 68a and 68b. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. The detected signals are processed by a downhole computer 70 to determine the resistivity and dielectric values.

An inclinometer 74 and a gamma ray device 76 are suitably placed along the resistivity measuring device 64 for respectively determining the inclination of the portion of the drill string near the drill bit 50 and the formation gamma ray intensity. Any suitable inclinometer and gamma ray device, however, may be utilized for the purposes of this invention. In addition, position sensors, such as accelerometers, magnetometers or gyroscopic devices may be disposed in the BHA to determine the drill string azimuth, true coordinates and direction in the wellbore 26. Such devices are known in the art and are not described in detail herein.

In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place. The above described resistivity device, gamma ray device and the inclinometer are preferably placed in a common housing that may be coupled to the motor. The devices for measuring formation porosity, permeability and density (collectively designated by numeral 78) are preferably placed above the mud motor 55. Such devices are known in the art and are thus not described in any detail.

As noted earlier, a large portion of the current drilling systems, especially for drilling highly deviated and horizontal wellbores, utilize coiled-tubing for conveying the drilling assembly downhole. In such application a thruster 71 is deployed in the drill string 90 to provide the required force on the drill bit. For the purpose of this invention, the term weight on bit is used to denote the force on the bit applied to the drill bit during the drilling operation, whether applied by adjusting the weight of the drill string or by thrusters. Also, when coiled-tubing is utilized the tubing is not rotated by a rotary table, instead it is injected into the wellbore by a suitable injector 14a while the downhole motor 55 rotates the drill bit 50.

The azimuthal (horizontal) axis of the image goes from 0 to 360°. During drilling the tool sensors intersect and record bed boundaries. The intersections appear on the image as sine waves with a period of 360°. For density data or resistivity date, bed boundaries are represented by sine waves in 90% of the cases. Drilling through an intersection of multiple beds, faults or fractures can produce more complicated shapes. DCT (Discrete Cosine Transform) technique provides more efficient image compression than WT (Wavelet Transform), even though WT has better energy localization than DCT.

In real time geosteering, it may be desirable to stay within the boundaries of one formation, and capture only that portion of data where the tool crosses or approaches that bed boundary. Also, it may be desirable to capture bed boundaries which have specific relative dip-angle, or other criteria.

A cost function (defined as a function generated from data to locate a bed boundary, and determine the density value) is combined with an image compression technique to provide a reconfigurable algorithm. This process provides better compression ratios (and efficiencies) when using small blocks of data. It also allows calculation of relative apparent dip angle and dynamically determines compression ratio.

MWD telemetry continuously adjusts its frequency according to depth, mud weight, etc. The telemetry rate (communication) from tool to surface versus surface to tool is much faster. Typically, it takes 5 to 15 min. to down-link a command. Communication is considered half duplex for all applications. Parity check is used to determine if a single bit error has occurred. It does not guarantee error-free transmission. Compressed data requires near error free telemetry. As the bit error rate increases, the amount of data that can be compressed decreases. This will minimize data loss.

Broadly speaking, three methods may be used in the present invention. The first one, referred to as Method 1, is used uf the bit error rate is greater than about $10^{-1}$ and zero latency is desired. Method 2 is used if data needs to be compressed and then transmitted at every drill stand (when drilling is interrupted to add another length of drill-pipe). Method 3 is used when image compression based on feature extraction is desirable.

A first embodiment of the invention, referred to as Method 1, compresses only one azmuthal acquisition at a time (# of sectors per depth sample). It does not use information from multiple depth samples. For density data in this example, the acquisition consists of 8 sectors but any number are possible. The binning of the data into sectors may be done using a correction for non-uniform rotation of the BHA as taught in U.S. patent application Ser. No. 10/998,494 of Estes et al., having the same assignee as the present invention and the contents of which are incorporated herein by reference. The DCT is an energy localization technique applied to these data, however the WT can also be used similarly. The 1-dimensional DCT is calculated for a vector of length N using:

$$y(m) = \sqrt{\frac{1}{N}} \sum_{k=0}^{N-1} x(i) \cos \frac{(2k+1)m\pi}{2N} \quad m = 0 \quad (1)$$

$$y(m) = \sqrt{\frac{2}{N}} \sum_{k=0}^{N-1} x(i) \cos \frac{(2k+1)m\pi}{2N} \quad m \neq 0.$$

It should be noted that the term "depth" as used in this document generally refers to the vertical direction in image plots and is not the true depth of the borehole. In this sense, measurements at a single depth refers to measurements made over a single revolution of the BHA. The conversion of the measurements to true depth is done at the surface using known methods.

Figure 2:
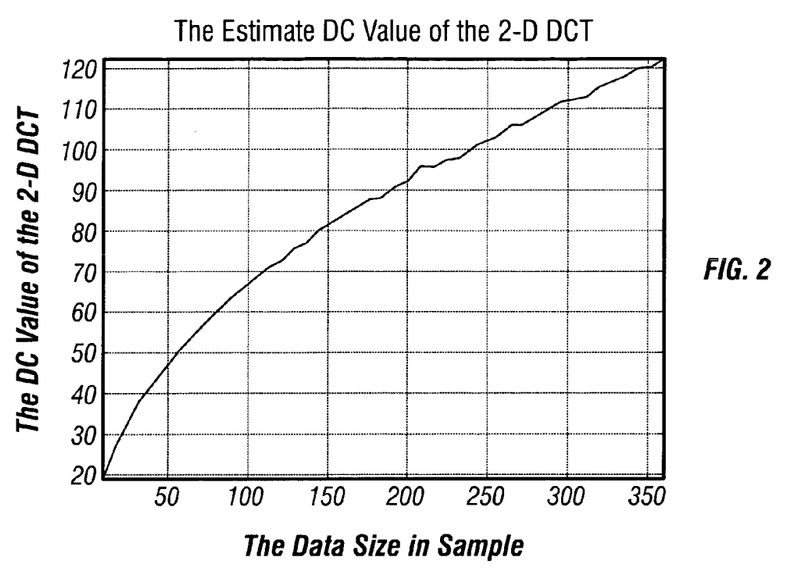
FIG. 2 shows the estimated value of the DC component of a 2-D Cosine transform (CT) as a function of block data size.
Figure 3:
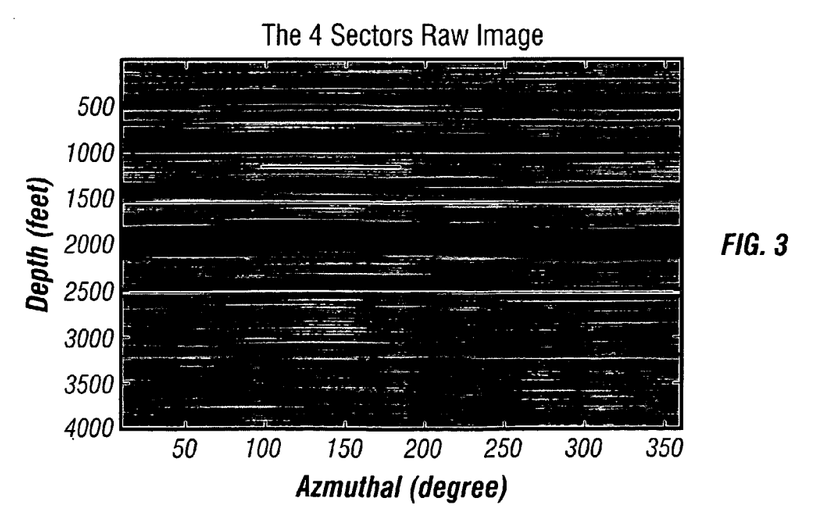
FIG. 3 shows eight sectors of raw density data.

FIG. 2 shows the estimated value of the DC component of the 2-D DCT versus data size. The abscissa of FIG. 2 shows the block size of the data. The ordinate shows the estimate DC value of the 2-D DCT. DC replacement is an option. In cases where the DC has not been re-placed by its estimated value, the DC value has to be processed separately for Method 1, as well as Method 2 and Method 3 described below. FIG. 3 shows an exemplary raw data set with 8 sectors.

We refer to data that is compressed with a 16 bit word defined as low resolution and data compressed with a 32 bit word as high resolution. For low resolution compression, at least the largest two coefficients (DCT) are kept and quantized. The rest of the coefficients will be set to zero. For high resolution compression, at least the largest three coefficients (DCT) will be kept and quantized. The rest of the coefficients will set to zero. Data is compressed downhole, then uncompressed on surface, then displayed as a 2-dimensional, or 3-dimensional image, or as log curves.

Figure 4:
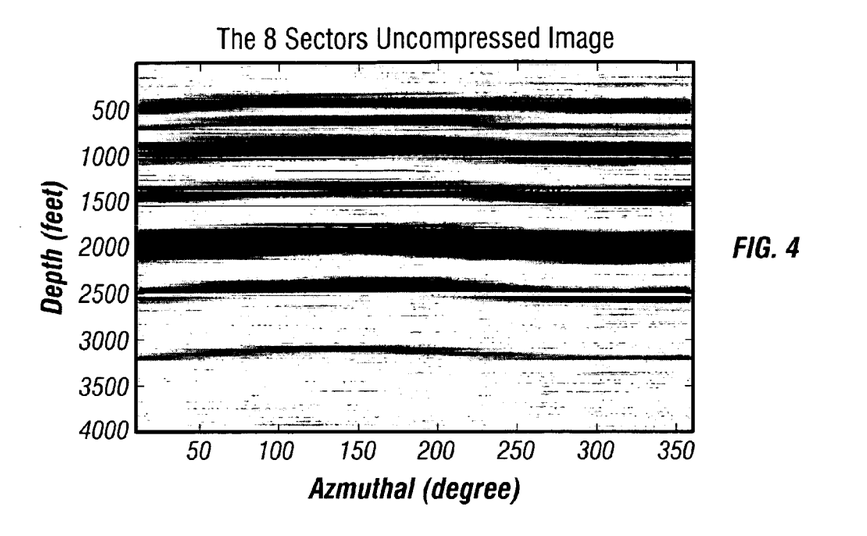
FIG. 4 shows a 16 bit image compressed with low resolution using a first method of the present invention.
Figure 5:
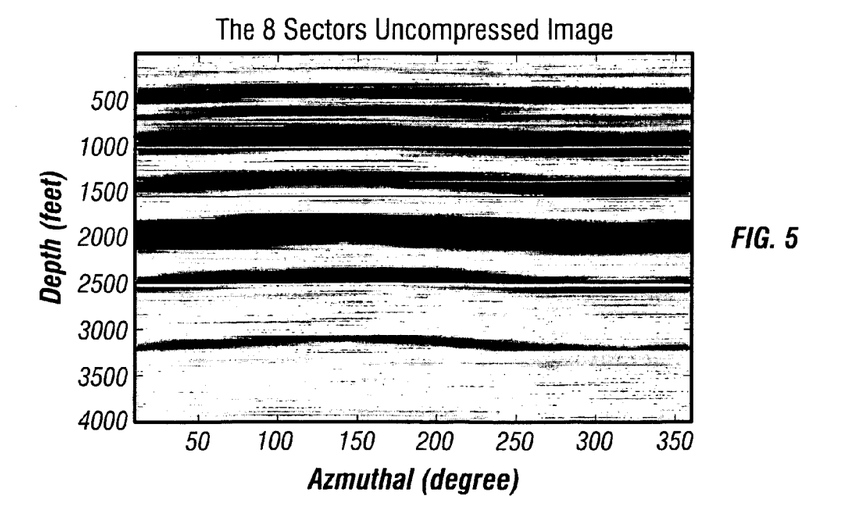
FIG. 5 shows a low resolution image compression using the first method of the present invention.
Figure 6:
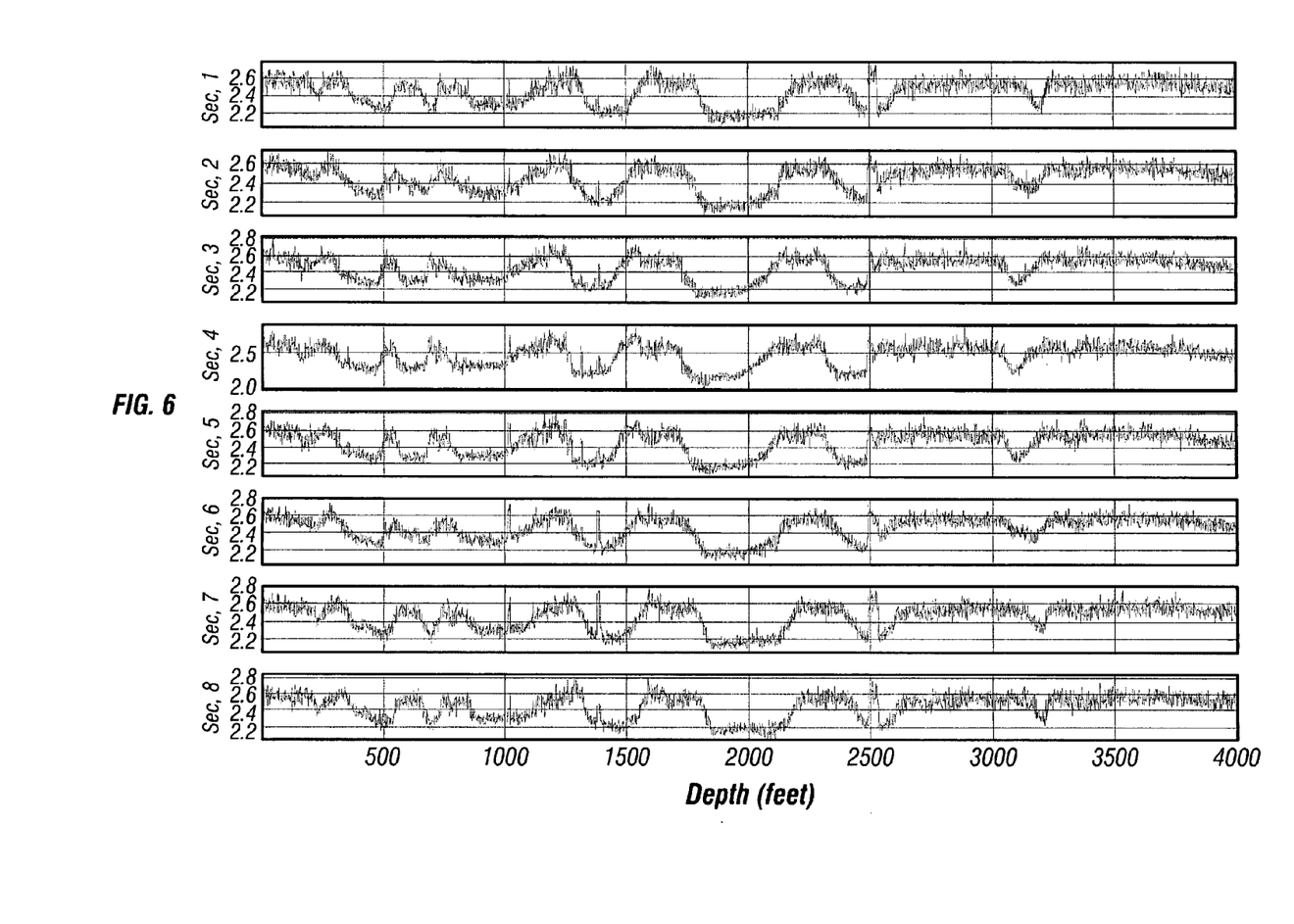
FIG. 6 shows a high resolution image compression using the first method of the present invention.

The compression algorithm can be applied to individual depth levels with some depth levels skipped. FIG. 4 shows a low resolution compression of the data of FIG. 3 using method 1 while FIG. 5 shows the high resolution compression of the image of FIG. 3. The degradation of image resolution is insignificant for 8 sectors. For 16 sectors, low resolution option may degrade image quality. FIG. 6 shows a comparison of raw data and uncompressed data using the low resolution 16 bit word option. Little difference is seen between the two.

In a second embodiment of the present invention, referred to as Method 2, data over a drill stand (data acquired for the addition of a single segment of pipe to the drill string) is accumulated and compressed. Compression of the data is carried out using a 2-D DCT, which is a method of energy localization. The size of a data block from one drill stand at 2 samples per foot equals 8 times 180 data points. A 2-D DCT is applied on the entire image with out segmentation. It takes more time to calculate a 2-D DCT when it is applied to the entire data set without blocking data, but it is a more efficient compression method. It reduces the blocking effect with a higher compression ratio, and allows the use of DCT as an efficient multi-resolution image compression technique. It should be noted that instead of a DCT, a wavelet-transform could be used.

An 8 times 256 block of data with block size of 8 by 8, the calculation time through azimuthal data is not going to change, but the calculation time through depth data will be increased by approximately a factor of 2. However there is a significant time savings by rearranging blocks and dealing with the DC component for every block. The DC value will be replaced by the difference between its estimated value and its actual value, as in Method I.

The second part of the compression is quantization. Data quantization has been spilt into two steps, dynamic range reduction, and a modified EZW (Embedded Zero-tree Wavelet encoder). The modified EZW involves set partitioning in hierarchical trees (SPIHT). Prior art methods segment the entire image to be compressed into a number of blocks, and apply the DCT and EZE to the separate blocks. It is well known that EZW is not an efficient method of compression when it is used in this manner with DCT. In the present invention, the combination of DCT (or a wavelet-transform) and SPIHT is done without blocking of the image. Using DCT (or a wavelet-transform) without blocking data lets SPIHT produce a multi-resolution data/image compression with a high compression ratio. SPIHT is discussed in *Data Compression: the Complete References,* 1998, Second Edition, David Salomon, Springer Verlag.

A linear quantizer is used, however in some cases coefficients have very big values relative to other coefficients. It is likely that those values will be located in the first column of data based on the properties of the 2-D DCT. The number of elements in the first column depends on the block data size. If the length of the data is less than 360 depth intervals, the largest coefficients will be located in the first eight elements of the first column. So the integer values of the first few coefficients are coded separately and are replaced by the difference between their actual value and their coded value. Data are multiplied by a quantization matrix, which has been obtained using a statistical method over large data sets, then quantized by SPIHT.

The data matrix is scanned with multiple passes. In every pass every element is compared to a threshold. If it is above that threshold it is replaced by the actual value of the element minus a constant times the threshold. The constant is calculated adaptively. The threshold is reduced in a predetermined order for every pass until a desired tolerance has been achieved. Every pass represents one level of data/image resolution. The first part of the image data is important to be able recover the image. Compressed data is stored in downhole (tool) memory with a high resolution. The user determines the size of the transmitted data block, which defines the resolution of the reconstructed data/image.

The third part of image compression is coding. Data is encoded with two steps. dynamic range reduction code, and SPIHT Code. For the dynamic range reduction code, the first eight data points are assigned three bits per data point. If a data point has a maximum value it indicates that the next value should be added to the maximum value of the current data to obtain the actual data value for that element. The output of SPIHT is one of four symbols (P, N, Z, and T), where the symbol T has more probability to be found in the data, then the other symbols. T is assigned 0, Z assigned 10, N is 110, and P is assigned 111.

Image/data compression based on feature extraction is a technique that uses predetermined knowledge from offset wells, seismic data and models, to optimize bandwidth, improve compression ratio, and automate the compression algorithm. Only data from regions that meets specific criteria (region of interest) are compressed and transmitted. Regions that have uncertainty are compressed and transmitted with low resolution. Feature extraction has been achieved using what is called a cost function.

Figure 7:
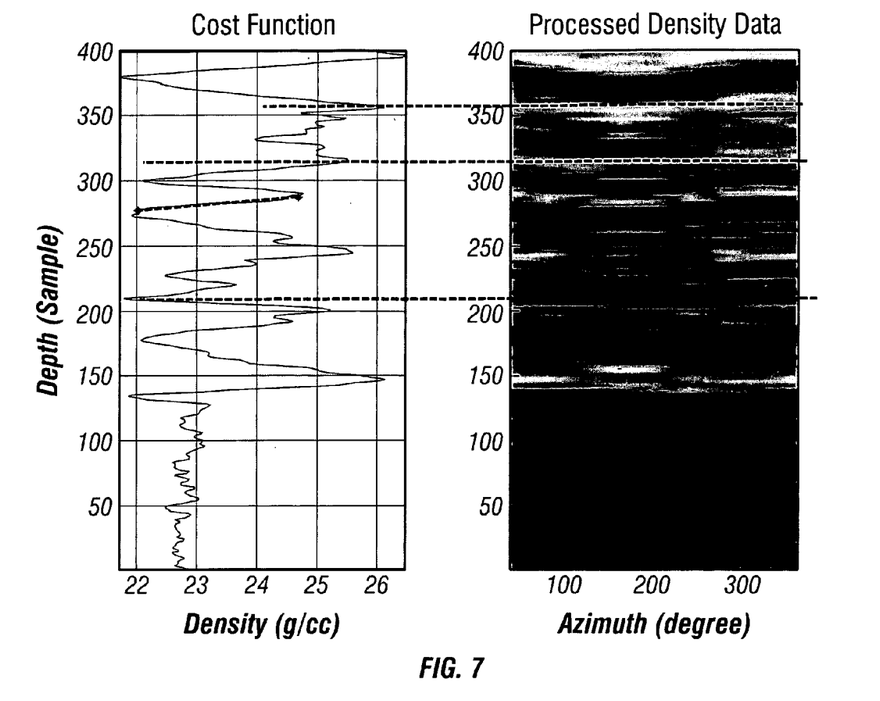
FIG. 7 shows azimuthal density data (right), and the associated Cost Function (left)

Feature extraction allows the transmission of image data related to a region of interest with zero latency. Method 3 is used to dump tool memory without segmenting data in the middle of a feature, and with a variable compression ratio. A cost function, based on direction of change in data and changes in value, is used to extract features. An example of the use of a cost functions is found in U.S. patent application Ser. No. 10/892,011 of Hassan et al., having the same assignee as the present invention and the contents of which are incorporated herein by reference. Any maximum or minimum of that cost function indicates possible locations of bid boundaries (feature). A region between two zeros around a maximum or minimum indicates a possible location of a feature. Zeroes are obtained from the first derivative of the cost function. If the slope of the cost function in the neighborhood of an expected segmentation is close to zero, this means that there are no shared features in the current block of data with the next block of data. If the absolute value of the cost function is close to or greater than one, it means that there is a feature that is going to be shared between that block and the next data block. In case of a feature that shares two data blocks, the size of the first block will be modified, so that feature will only be allocated to one data block. The distance between location of the last zero of the first derivative of the Cost Function and the end of the current data block determines the overlap region. FIG. 7 shows an example of density data and its Cost Function. This cost function is an azimuthally weighted average (over the sectors) of the measurements. The weights are obtained by a least-squares minimization of the weighted average with respect to the individual measurements. This is not intended to be a limitation of the invention and other cost functions could be uses.

When a tool intersects bed boundaries, it generally appears as an ellipse, which has two major axis of symmetry; vertical axis, and horizontal axis. In the case where the shape of a feature is not an ellipse, bed boundaries will have a horizontal axis of symmetry. A cost function gives information about the variation of formation density around the borehole, the start of a bed boundary, the end of a bed boundary, the density value, the direction of change of data, and the horizontal axis of symmetry which corresponds to the point that has zero slop in the cost function. The cost function is shown in the left side of FIG. 7. The horizontal axis of symmetry is very important, because it allows the determination of a feature from only half the data. As soon as a symmetric point is found, half of the data for that feature is available. The tool compresses this portion of data and transmits it. The decoder replicates the second half of data based on the symmetry. Therefore the region of interest is available in real time with zero latency.

Based on the symmetry, the expected value of the data returns to its previous value, and the slope of the data approaching that point may be changed. It may change due to the rate of penetration. As soon as the data returns to it previous value, the tool sends two status bits to confirm data validity, otherwise it recompresses the second half of the feature and sends it to surface. In this case the latency will be half of the time required to transmit this feature. Predetermined knowledge about the reservoir allows the cost function to trigger on data with specific criteria.

Figure 8:
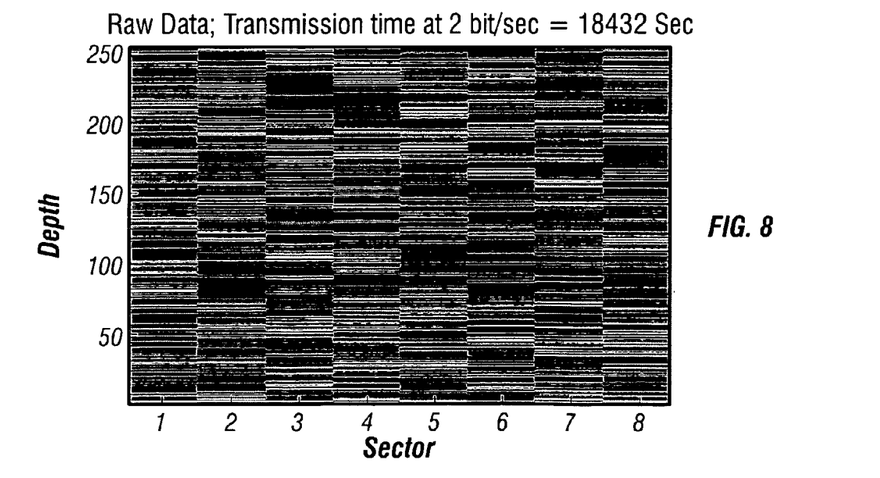
FIG. 8 shows raw data without interpolation or coloring.
Figure 9:
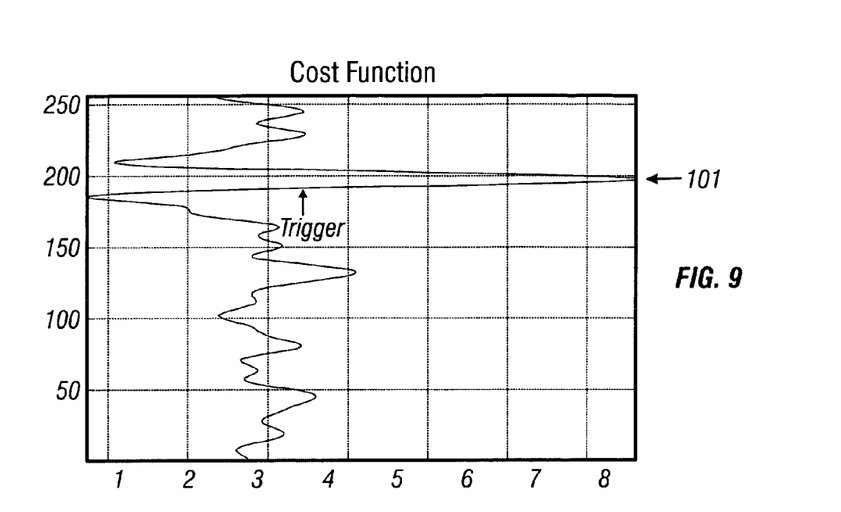
FIG. 9 shows the cost function.

FIG. 8 shows an exemplary raw data image without interpolation or coloring. A standard compression method would compress the entire image. Method 3, on the other hand, calculates a cost function as shown in FIG. 9. The cost function is triggered on the region of interest based on predetermined knowledge. It indicates that only one region indicated by 101 needs to be compressed and transmitted.

Figure 10:
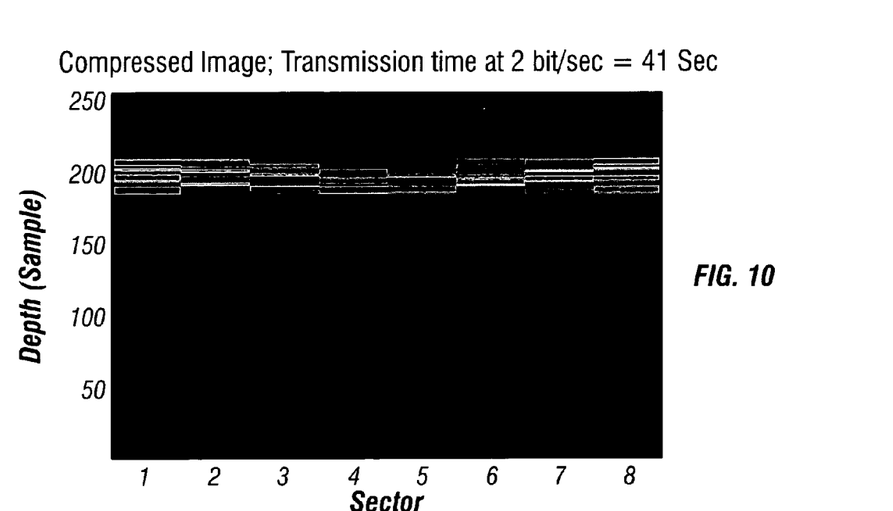
FIG. 10 shows a compressed image of the region of interest.

The cost function indicates the start and the end of the region of interest that needs to be compressed and transmitted. The region of interest is selected automatically. Most features have a cosine wave shape. These features can be clustered, and compressed further based on vector quantization strategy. Only regions of interest are compressed, transmitted and displayed at surface, as shown in FIG. 10. In this case the data is time stamped and transmitted to surface. This method optimizes the use of BW and allows regions of interest to be compressed and transmitted with high compression. In addition, regions of interest can be set to detect features hundreds of feet apart to less than a foot apart.

The cost function allows us to compress specific regions, with high resolution, some regions with low resolution, and other regions with no transmission. In addition, it is possible to detect features at specific apparent dip angle, or to detect bed boundary crossings during reservoir navigation.

Figure 11:
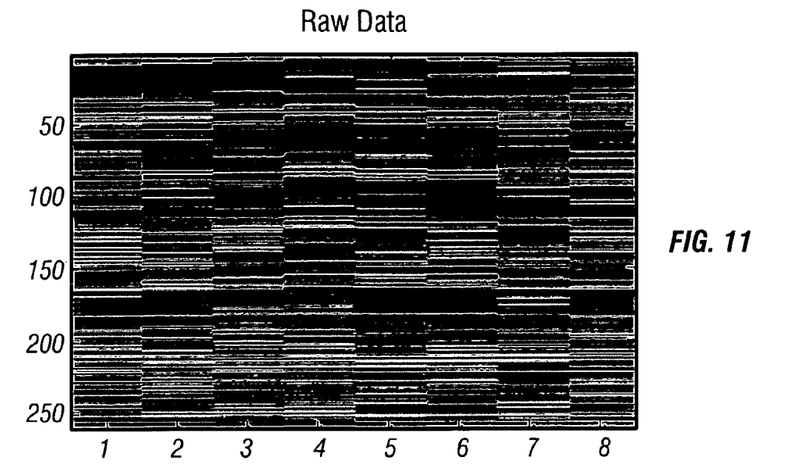
FIG. 11 shows a raw image.
Figure 12:
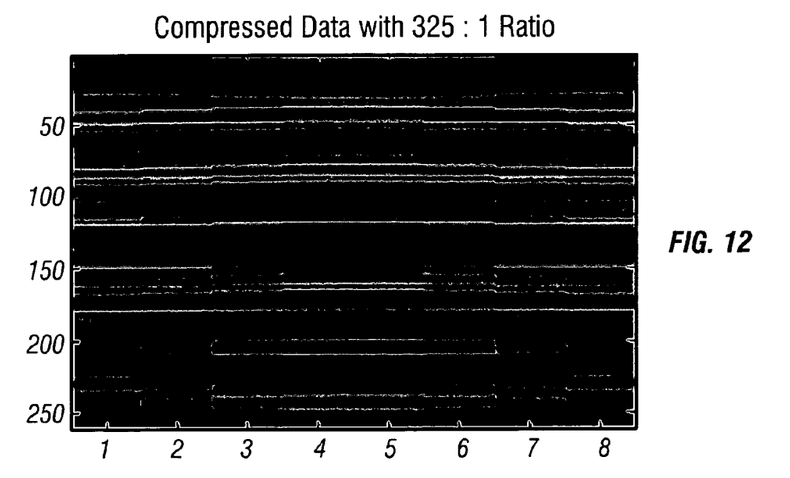
FIG. 12 shows an image compressed with low resolution using the third method of the present invention with a 325:1 compression ratio.
Figure 13:
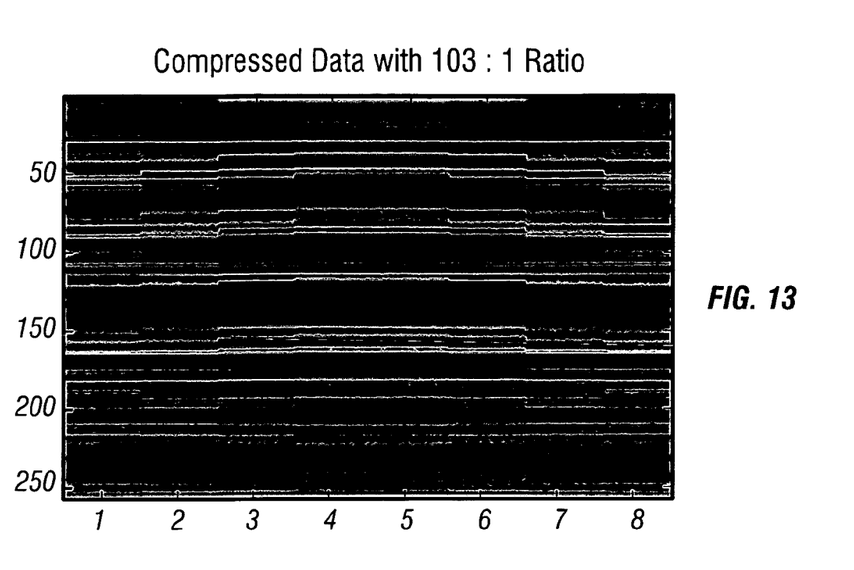
FIG. 13 shows an image compressed with low resolution using the third method of the present invention with a 103:1 compression ratio.

FIG. 12 shows the results of using Method 3 to compress the raw image of FIG. 11 with a (325:1) compression ratio. In FIG. 13, Method 3 was used to compress the raw image of FIG. 11 with a (103:1) compression ratio. When dumping tool memory, block size is determined based on bit error rate and the desire resolution. However, this size is continuously modified for every block in such a way that the block does not intersect a feature.

It should be noted that Methods 2 and 3 are both techniques that use DCT (or a wavelet-transform) to compress data/images as multi-resolution images.

Figure 14:
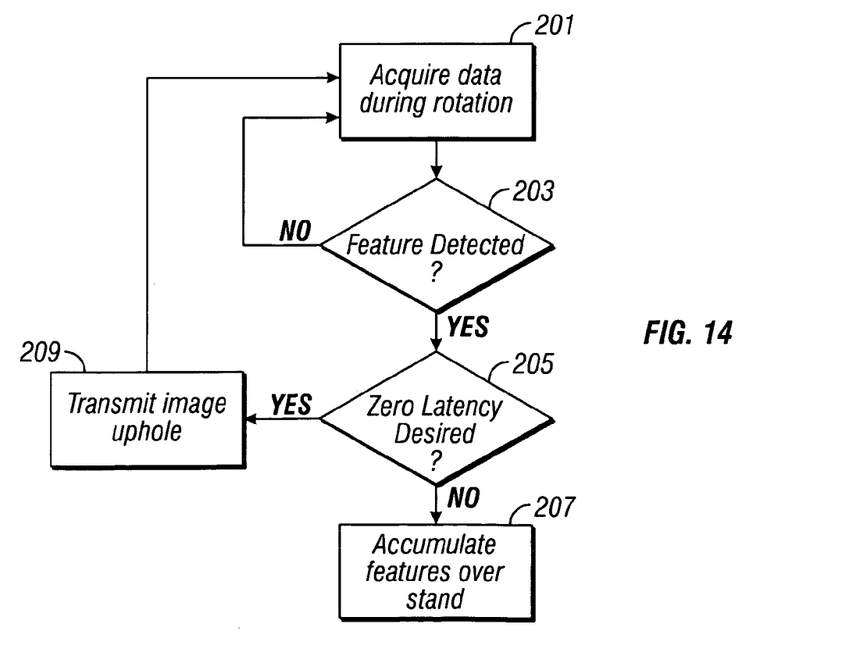
FIG. 14 shows a flow chart illustrating some aspects of the present invention.

Turning now to FIG. 14, a flow chart depicting various aspects of the invention is depicted. Data indicative of a property of the earth formation are acquired during rotation of the BHA. 201 Concurrent with the data acquisition, the azimuthal angle of the BHA is also measured. The downhole processor analyzes the data during the rotation. A cost function, based on direction of change in data and changes in value, is used to extract features 203. If no feature is detected, the data from further continued drilling are acquired and analyzed. If a feature is present, then a check is made to see if zero latency is desired 203. This may be referred to as checking for a latency key. If zero latency is desired, then data relating to the feature are transmitted uphole 208 with or without compression as discussed above. If zero latency is not desired, then data over a drill stand are accumulated 207. All the data within the stand are then analyzed (as discussed above) to detect features, compress them and transmit the compressed data uphole.

Figure 15:
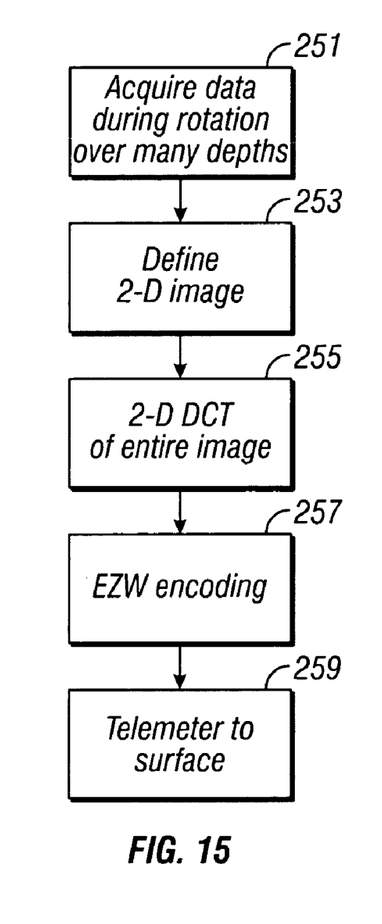
FIG. 15 shows a flow chart of an alternate embodiment of the invention.

FIG. 15 shows an embodiment of the invention in which data are acquired during rotation over many depths 201. These data define a 2-D image of the formation. A downhole processor performs a 2-D DCT of the entire image 255 followed by SPIHT 257 and transmission of the compressed data to the surface.

Figure 16:
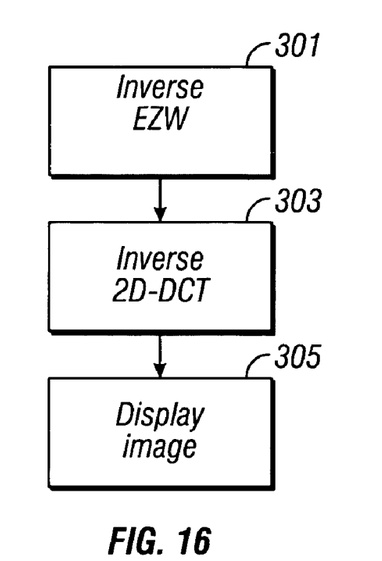
FIG. 16 shows a flow chart of some operations carried out at the surface on transmitted data.

FIG. 16 shows parts of the invention that are practiced at the surface. The data received at the surface are subjected to a reconstruction using an inverse SPIHT 201, an inverse 2D-DCT (or wavelet-transform) 303 and the image is then displayed 305. A human being may view the image and make appropriate changes to the drilling operations.

The data acquisition and processing may be controlled at least in part by the downhole electronics. Implicit in the control and processing of the data is the use of a computer program on a suitable machine readable medium that enables the processors to perform the control and processing. The machine readable medium may include ROMs, EPROMs, EEPROMs, Flash Memories and Optical disks. The term processor is intended to include devices such as a field programmable gate array (FPGA).

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of evaluating an earth formation, the method comprising:
    (a) conveying a bottomhole assembly (BHA) into a borehole in the earth formation;
    (b) using a formation evaluation sensor on the BHA for making measurements indicative of a property of the earth formation during rotation of the BHA;
    (c) identifying presence of a feature in the measurements;
    (d) performing a compression operation selected from: (i) a Discrete Cosine Transform; and (ii) a wavelet transform;
    (e) performing set partitioning in hierarchical trees (SPIHT); and
    (f) transmitting data to a surface location indicative of region of interest including the feature.

2. The method of claim 1 wherein identifying the feature further comprises using a cost function based on a direction of change of the measurements and a change in a value of the measurements.

3. The method of claim 1 wherein the feature is related to a bed boundary in the earth formation.

4. The method of claim 1 wherein the transmitted data comprises a dip and a location of a bed boundary.

5. The method of claim 1 further comprising checking for a latency key prior to (f).

6. The method of claim 1 further comprising identifying presence of an additional feature in the measurements within a drill stand prior to (f).

7. The method of claim 1 wherein making the measurements further comprises making at least one of (i) density measurements, (ii) porosity measurements, and (iii) resistivity measurements.

8. The method of claim 1 further comprising reconstructing an image of the formation.

9. An apparatus for evaluating an earth formation, the apparatus comprising:
    (a) a bottomhole assembly (BHA) conveyed into a borehole in the earth formation;
    (b) at least one formation evaluation (FE) sensor on the BHA which makes measurements indicative of a property of the earth formation during rotation of the BHA; and
    (c) a processor which:
        (A) identifies presence of a feature in the measurements;
        (B) performs a compression operation selected from (i) a Discrete Cosine Transform, and (ii) a wavelet transform;
        (C) performs set partitioning in hierarchical trees (SPIHT); and
        (D) transmits data to a surface location indicative of a region of interest including the feature.

10. The apparatus of claim 9 wherein the processor identifies the feature by further using a cost function based on direction of change of the measurements and a change in a value of the measurements.

11. The apparatus of claim 9 wherein the feature identified by the processor is related to a bed boundary in the earth formation.

12. The apparatus of claim 9 wherein the data transmitted by the processor comprises a dip and a location of a bed boundary.

13. The apparatus of claim 9 wherein the processor further checks for a latency key prior to (D).

14. The apparatus of claim 9 wherein the processor further identifies presence of an additional feature in the measurements within a drill stand prior to (D).

15. The apparatus of claim 9 wherein the FE sensor is selected from (i) a density sensor, (ii) a porosity sensor, and (iii) a resistivity sensor.

16. The apparatus of claim 9 further comprising a drilling tubular which conveys the BHA into the borehole.

17. The apparatus of claim 9 further comprising an orientation sensor which makes measurements during rotation of the BHA; wherein the processor uses the measurements of the orientation sensor for binning the measurements made by the FE sensor.

18. The apparatus of claim 9 further comprising a surface processor which reconstructs an image of the formation using the transmitted data.

19. A computer-readable medium for use with an apparatus for evaluating an earth formation, the apparatus comprising:
    (a) a bottomhole assembly (BHA) conveyed into a borehole in the earth formation; and
    (b) at least one formation evaluation (FE) sensor on the BHA which makes measurements indicative of a property of the earth formation during rotation of the BHA;
    the medium comprising instructions which enable a processor to:
    (c) identify presence of a feature in the measurements;
    (d) perform a compression operation selected from: (i) a Discrete Cosine Transform; and (ii) a wavelet transform;
    (e) perform set partitioning in hierarchical trees (SPIHT); and
    (f) transmit data to a surface location indicative of a region of interest including the feature.

20. The medium of claim 19 further comprising at least one of (i) a ROM, (ii) an EPROM, (iii) an EEPROM, (iv) a flash memory, and (v) an optical disk.

21. A method of evaluating an earth formation, the method comprising:
   (a) conveying a bottomhole assembly (BHA) into a borehole in the earth formation;
   (b) using a formation evaluation sensor on the BHA for making measurements indicative of a property of the earth formation during rotation of the BHA;
   (c) defining an image defined substantially over 360° using the measurements over a range of depths of the BHA;
   (d) compressing the full image using (I) a single 2-D transform of the entire image, and (II) a quantization involving set partitioning in hierarchical trees (SPIHT); and
   (e) transmitting a compressed image to a surface location.

22. The method of claim 19 wherein making the measurements further comprises making at least one of (i) density measurements, (ii) porosity measurements, and (iii) resistivity measurements.

23. The method of claim 21 further comprising reconstructing an image of the formation using the compressed image.

24. An apparatus for evaluating an earth formation, the apparatus comprising:
   (a) a bottomhole assembly (BHA) conveyed into a borehole in the earth formation;
   (b) at least one formation evaluation (FE) sensor on the BHA which makes measurements indicative of a property of the earth formation during rotation of the BHA; and
   (c) a processor which:
      (A) accumulates the measurements to define an image over substantially 360° over a range of depths,
      (B) compresses the entire image using a single 2-D transform and a quantization involving set partitioning in hierarchical trees (SPIHT), and
      (C) transmits a compressed image to a surface location.

25. The apparatus of claim 24 wherein the FE sensor is selected from the group consisting of (i) a density sensor, (ii) a porosity sensor, and (iii) a resistivity sensor.

26. The apparatus of claim 24 further comprising a surface processor which reconstructs an image of the formation.

* * * * *